United States Patent
Vahabzadeh et al.

(10) Patent No.: US 6,287,227 B1
(45) Date of Patent: Sep. 11, 2001

(54) HYDRAULIC CONTROL FOR A CONTINUOUSLY VARIABLE TRANSMISSION

(75) Inventors: Hamid Vahabzadeh, Oakland; Norman Kenneth Bucknor, Troy, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/398,281

(22) Filed: Sep. 20, 1999

(51) Int. Cl.[7] ................................................. F16H 63/06
(52) U.S. Cl. ................................................. 474/28; 474/18
(58) Field of Search ..................... 474/28, 18, 1

(56) References Cited

U.S. PATENT DOCUMENTS

| | | | |
|---|---|---|---|
| 4,158,290 | * | 6/1979 | Cornell ................................ 60/445 |
| 5,046,991 | * | 9/1991 | Friedmann ............................ 474/18 |
| 5,108,348 | * | 4/1992 | Bornmann ............................ 474/18 |
| 6,110,062 | * | 8/2000 | Fujikawa .............................. 474/28 |

* cited by examiner

Primary Examiner—David A. Bucci
Assistant Examiner—Vicky A. Johnson
(74) Attorney, Agent, or Firm—George A. Grove

(57) ABSTRACT

A continuously variable transmission (CVT) has a drive sheave and a driven sheave, each of which has an adjustable portion, that are positioned by hydraulic control pistons. The pistons are pressurized from a control system to properly position each adjustable portion, such that a flexible drive member, trained over the sheaves, operates at the required diameter to establish the desired speed ratio between the drive sheave and the driven sheave. The control has two variable displacement pump assemblies that supply hydraulic fluid at the required pressure to maintain the desired ratio and to effect a ratio change as required by the operating conditions. One of the pumps supplies a primary pressure which is proportional to the torque requirement of the CVT and the other pump supplies the necessary pressure bias to effect the ratio change. The ratio control pump is variable to both sides of a neutral condition such that the ratio control fluid can be delivered to either adjustable portion while the primary pump maintains the required torque capacity pressure in the system.

1 Claim, 3 Drawing Sheets

HYDRAULIC CONTROL FOR A CONTINUOUSLY VARIABLE TRANSMISSION

TECHNICAL FIELD

This invention relates to hydraulic controls and more particularly to hydraulic mechanisms for controlling the ratio in a continuously variable transmission.

BACKGROUND OF THE INVENTION

Continuously variable transmissions (CVT), of the variable pulley or sheave type, employ sheave assemblies having at least one member that is movable to control the diameter at which a flexible transmitter, such as a belt or chain, operates. The transmission has an input sheave and an output sheave, both of which have an adjustable member. The transmission ratio between the input and output sheaves varies between an underdrive ratio and an overdrive ratio.

The CVT ratio is continuously variable between the extremes of the underdrive and overdrive ratios. During the underdrive ratios, the flexible transmitter is positioned at a small diameter on the input sheave and a large diameter on the output sheave. Thus, the input sheave has more than one revolution for each revolution of the output sheave. As the diameter of the input sheave increases, the diameter of the output sheave decreases until a one-to-one ratio exists across the sheaves. During the overdrive ratios, the diameter of the input sheave is maintained larger than the diameter of the output sheave. Thus, each revolution of the input sheave results in more than one revolution of the output sheave.

To accommodate the ratio variance, at least one member of each sheave is disposed to slide axially relative to the other member of the sheave. The movable member has a control piston that is pressurized to urge the member to the desire axial position at which the effective sheave diameter will provide the desired ratio. With the currently available electro-hydraulic controls, when a ratio change is effected, the piston of one of the sheaves is supplied with additional fluid, at a higher pressure, while the piston of the other sheave is exhausted of excess fluid. The exhausted fluid is returned to a transmission sump or reservoir. When a ratio change in the opposite direction is requested, the piston that was exhausted is resupplied with fluid while a portion of the fluid in the other piston is exhausted to the sump.

SUMMARY OF THE INVENTION

It is an object of the present invention to provide an improved control system for a continuously variable transmission.

In one aspect of the present invention, two variable displacement control pumps supply hydraulic fluid to the ratio control pistons of variable sheaves in a continuously variable transmission. In another aspect of the present invention, one of the pumps supplies the primary control pressure to the ratio control pistons. In yet another aspect of the present invention, the other pump supplies a ratio control pressure that is additive to the primary supply pressure at one of the ratio control pistons.

In still another aspect of the present invention, the ratio control pump has a center neutral position. In a further aspect of the present invention, the ratio control pump is moved to one side of the center neutral position when the ratio is being changed to reduce the speed ratio and to the other side of center to increase the speed ratio.

A CVT has two variable sheave members, each of which has a movable half that is controlled by a respective hydraulic piston. The pistons are pressurized to adjust the movable half to a position that will provide the desired speed ratio between the sheave members. The minimum pressure at each piston must be sufficient to support the torque being transmitted by the CVT. The speed ratio between the sheave members is changed, when requested, by increasing the pressure on one of the sheaves while maintaining the torque required pressure on the other of the sheaves.

A variable displacement primary pump supplies the fluid pressure necessary to support the torque requirement of the CVT. A variable displacement ratio pump supplies the added pressure necessary to change the speed ratio in the CVT. The primary pump is connected through check valves to supply fluid to both of the movable sheave halves while the ratio pump is disposed to transfer fluid to one of movable sheave halves. The ratio pump therefore increases the pressure on the movable half that must be adjusted to provide the desired ratio. The ratio pump is variable through a neutral or zero displacement position such that on one side of neutral, the driven sheave is supplied additional pressure, and on the other side of neutral, the drive sheave is supplied with additional pressure. When the ratio adjustment is complete, the ratio pump assumes a displacement sufficient to supply any make-up fluid that might be lost through leakage.

DESCRIPTION OF THE EXEMPLARY EMBODIMENTS

Figure 1:
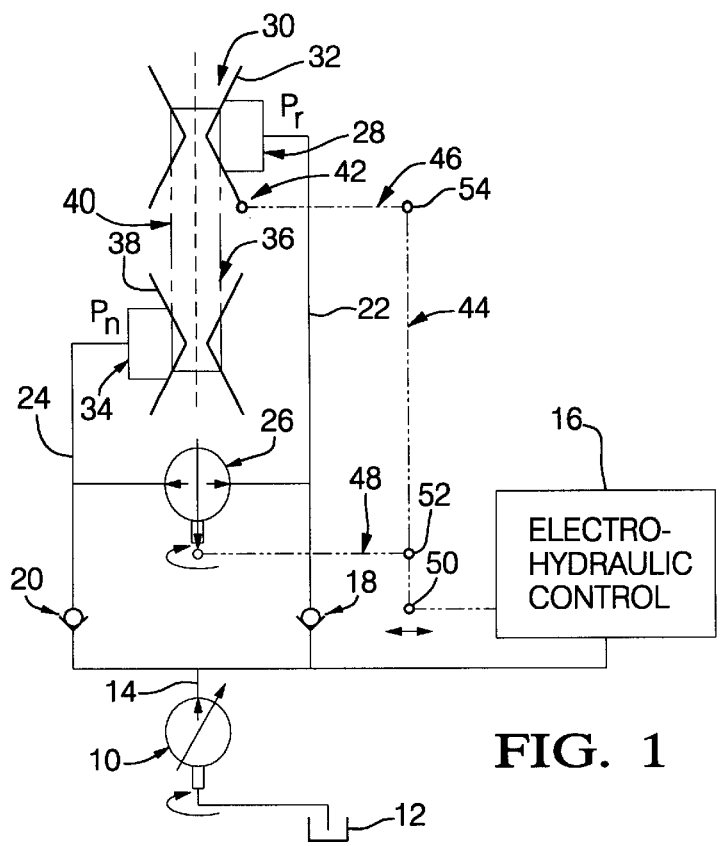
FIG. 1 is a schematic representation of a continuously variable transmission incorporating the present invention.

Referring to the drawings, wherein like characters represent the same or corresponding parts throughout the several views, there is seen in FIG. 1 an engine driven primary pump 10 that draws fluid from a reservoir 12 and delivers the fluid to a passage 14 that is in fluid communication with a conventional electro-hydraulic control 16 and a pair of check valves 18 and 20. The electro-hydraulic control 16 includes an electronic control unit with a conventional preprogrammed digital computer, not shown, that is adapted to issue control signals based on or derived from various input signals such as speed and torque. As is well known, the control signals issued by the control 16 are effective to establish the speed ratio in the CVT and the pressure developed at the pump 10.

The check valve 18 controls fluid communication between the passage 14 and a drive sheave control passage 22. The check valve 20 controls fluid communication between the passage 14 and a driven sheave control passage 24. The check valves 18 and 20 inhibit fluid flow from the respective passages 22 and 24 to the passage 14. The check valves 18 and 20 will also prevent fluid flow from the passage 14 to the passages 22 and 24 when the pressure in either of these passages is greater than the pressure in the passage 14. The passage 22 is in fluid communication with an engine driven ratio control pump 26 and a control piston 28 of a drive sheave 30. The control piston 28 controls the axial position of a sheave half 32 of the sheave 30 in a well-known manner. The passage 24 is in fluid communication with the ratio control pump 26 and a control piston 34 of a driven sheave 36.

The control piston 34 controls the axial position of a sheave half 38 of the sheave 36 is a well-known manner. The drive sheave 30 and the driven sheave 36 are interconnected frictionally by a flexible transmitting mechanism such as a belt or chain 40. The drive sheave 30, driven sheave 36 and transmitting mechanism 40 combine to form a continuously variable transmission (CVT) 42. The drive sheave is drivingly connected with a conventional engine, not shown, in a well-known manner such as through a clutch or torque converter. The driven sheave is drivingly connected with a vehicle drive wheels, not shown, through conventional mechanisms such as a clutch and planetary gearing.

When the transmitting mechanism 40 is trained about the sheaves 30 and 36 at equal diameters, a one-to-one drive is presented between the sheaves 30 and 36. When the sheave half 28 is moved rightward and the sheave half 38 is moved rightward, the transmitting mechanism 40 will be at a smaller diameter on the sheave 30 and a larger diameter on the sheave 36 such that an underdrive ratio will be presented between the sheaves 30 and 36. When the sheave half 32 is moved leftward, from the neutral position, and the sheave half 38 is moved leftward, a larger diameter is attained at the sheave 30 and a smaller diameter is attained at the sheave 36 such that an overdrive is presented between the sheaves 30 and 36. Those skilled in the art will be familiar with the operation of CVTs such as that described above.

Figure 5:
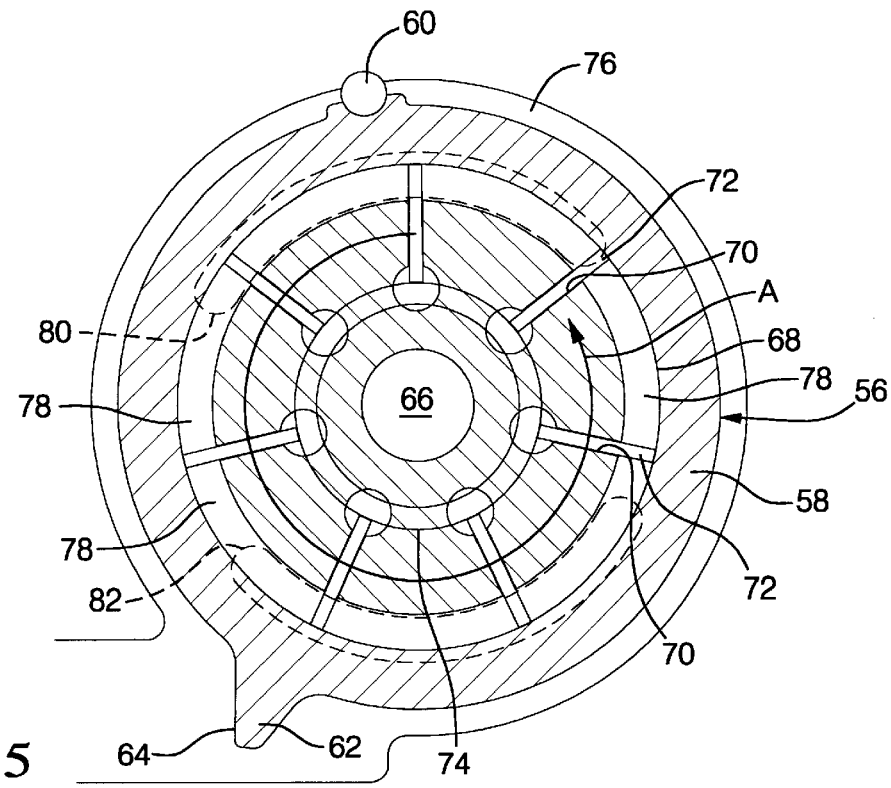
FIG. 5 is an elevational view of a portion of the ratio control pump in the neutral condition.

The pump 10 is the primary source of fluid for the system and as such supplies pressurized fluid to both the control 16 and the CVT 42. The pump 10 is preferably a variable displacement device; however, a fixed displacement pump will perform satisfactorily. The use of a variable displacement pump increases the overall efficiency of the powertrain in which the CVT 42 is used. The ratio control pump 26 is a variable displacement fluid translating mechanism which may be constructed as a vane pump, as shown in FIG. 5. The pump 26 may also be constructed in accordance with any of the well-known variable displacement hydraulic fluid translating mechanisms.

The pump 26 is capable of moving fluid from the passage 22 to the passage 24 and vice versa. When the pump 26 is conditioned to move fluid from the passage 24 to the passage 22, the pressure in the passage 22 will be higher than the pressure in the passage 24 such that the check valve 18 will be closed and the check valve 20 will be open to permit fluid flow from the pump 10 to the passage 24 to ensure that the pressure at the control piston 34 is sufficient to support the torque requirement of the CVT 42. When the pump 26 is conditioned to move fluid from the passage 22 to the passage 24, the pressure in the passage 24 will be higher such that the check valve 20 will be closed and the check valve 18 will be open to permit flow from the pump 10 to the passage 22 to ensure that the pressure at the control piston 28 is sufficient to support the torque requirement of the CVT 42. When the pump 26 is in neutral or at zero displacement, the pump 10 will supply fluid to both passages 22 and 24 at a pressure level required by the system.

The pump 26, control piston 28 and sheave half 32 are connected with the electro-hydraulic control by a convention control mechanism such as a lever 44 and linkages 46 and 48 shown in chain line in FIGS. 1, 2, 3 and 4. The lever 44 has first node 50, a second node 52 and a third node 54 connected with the control 16, the linkage 48 and the linkage 46, respectively. When the electro-hydraulic control 16 commands the node 50 to move, the node 54 becomes the fulcrum and the node 52 and linkage 48 become the output. The linkage 48 changes the displacement of the pump 26 such that the pressure in either passage 22 or 24 is increased.

Figure 2:
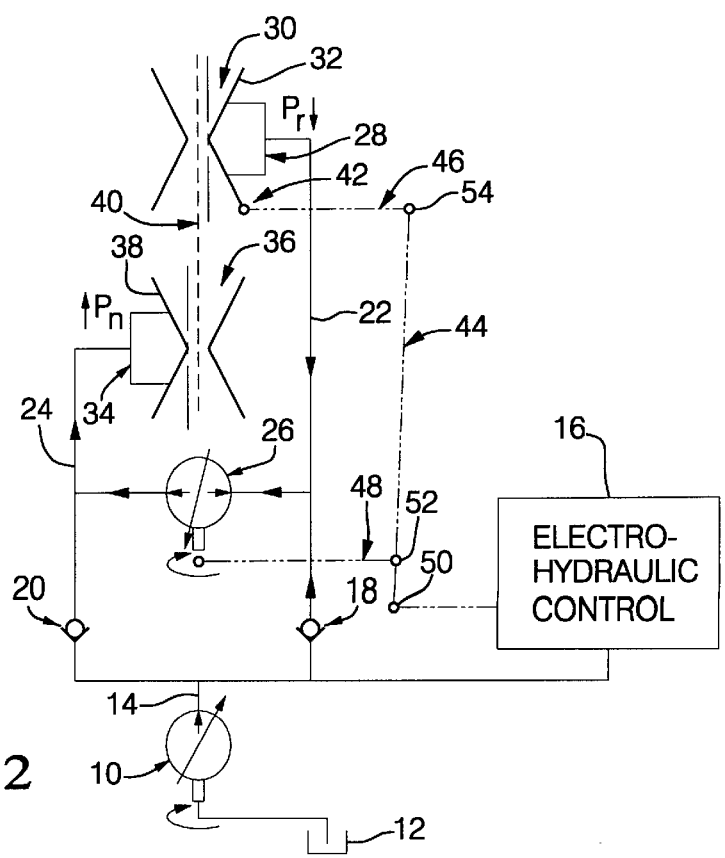
FIG. 2 is a schematic representation of a continuously variable transmission in an underdrive ratio incorporating the present invention.

As the pressure in passage 24 is increased, the electro-hydraulic control 16 has signaled to cause a downshift ratio change which will cause the system to react as shown in FIG. 2. When the node 50 becomes stationary, it will become the fulcrum in the system and the node 54 will be the input as the sheave half 32 moves in response to the pressure differential between the passages 22 and 24. When a down shift command is made, the ratio pump 26 is controlled to increase the pressure in the passage 24 and therefore the control piston 34. This will cause the sheave half 38 to move axially such that the flexible transmitting mechanism 40 will move to a larger diameter.

Due to the increase in tension in the flexible transmitting mechanism 40, the sheave half 32 will be forced rightward, thereby decreasing the operating diameter at the sheave 30. When the CVT 42 reaches the newly commanded ratio, the linkage 48 and lever 44 will have moved the displacement of the ratio pump 26 toward the neutral position. The ratio pump 26 will only move enough fluid to compensate for any leakage in the system. As the ratio pump 26 moves the fluid from the passage 22 to the passage 24, the primary pump 10 will supply make-up oil to the passage 22. The pressure output of the primary pump 10 is controlled by the electro-hydraulic control 16 to a level proportional to the torque transmission requirement of the CVT. It will now be obvious to those skilled in the art that the inlet pressure of the pump 26 is equal to the outlet pressure of the pump 10.

Figure 3:
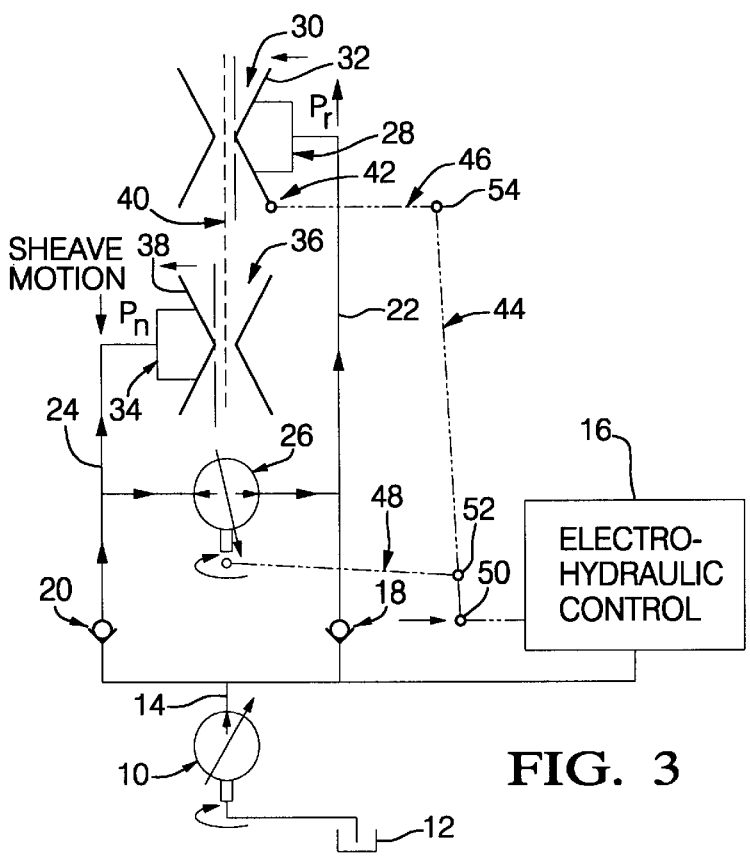
FIG. 3 is a schematic representation of a continuously variable transmission during a ratio change incorporating the present invention.
Figure 4:
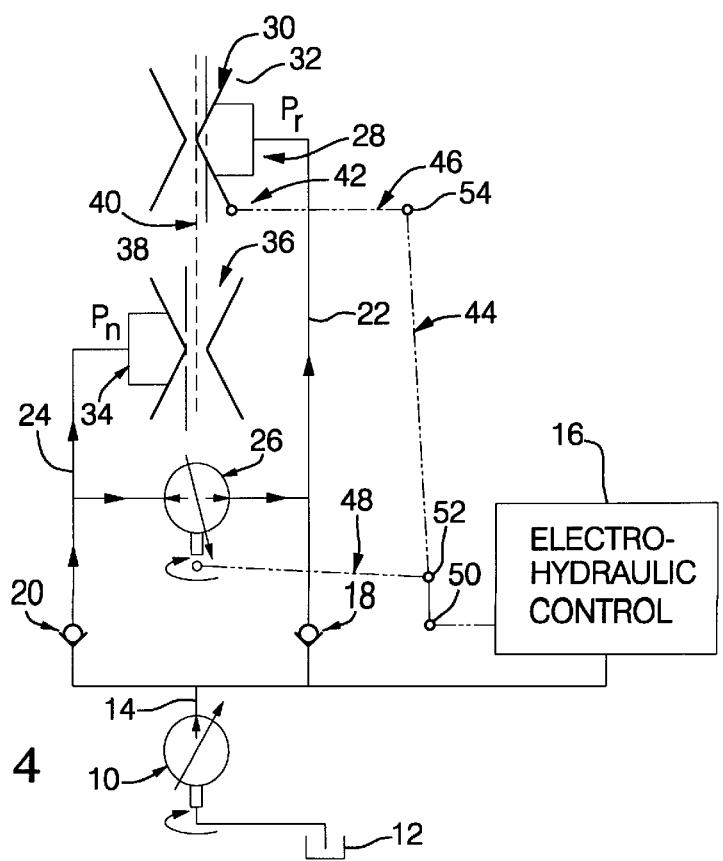
FIG. 4 is a schematic representation of a continuously variable transmission in an overdrive ratio incorporating the present invention.

When the electro-hydraulic control 16 signals for a ratio change in the upshift direction, the node 52 will be moved rightward, as seen in FIG. 3. This will cause the ratio pump 26 to increase the pressure in the passage 22 while the pump 10 maintains the pressure in the passage 24 at the level required for the torque transmission level in the CVT. The control piston 28 will have the pressure therein increased, resulting in leftward movement of the sheave half 32. This will cause the flexible transmitter 40 to be moved to a larger diameter on the drive sheave 30 and a smaller diameter on the sheave 36 such that the speed of the driven sheave 36 will increase without a change in the speed of the drive sheave 30. Movement of the sheave half 32 will continue until the newly commanded ratio has been achieved and the system reaches a steady-state condition as shown in FIG. 4. As described above for FIG. 2, when the steady-state condition is reached, the ratio pump 26 will only move sufficient fluid to maintain the commanded pressure in the passage 22, and the pump 10 will supply the fluid necessary to maintain the system in equilibrium. It should now be appreciated why the primary pump 10 is preferably a variable displacement device.

FIG. 5 depicts an elevational view of a portion of a variable displacement pump 56. The pump 56 has a ring member 58 pivotally mounted on a pin 60. An extension 62 protrudes from the outer surface of the ring 58 to present a control surface 64 which is adapted to be connected with a conventional control member such as a rod or link, not shown. The pump 56 has a central drive shaft 66 that is connected with a rotor 68. The rotor 68 has a plurality of slots 70 in each of which is slidably disposed a vane 72. A vane ring 74 is positioned in the rotor 68 under the vanes 72 to hold the vanes 72 radially outward against the ring 58. The ring 58, rotor 68, vanes 72 and a pair of side walls, one of which is shown at 76, cooperate to form a plurality of chambers 78. The side wall 76 has a pair of ports 80 and 82 that communicate with the chambers 78 as the rotor 68 is rotated.

If the ring 58 is pivoted counterclockwise and the rotor 68 is rotated in the direction of arrow A, the chambers 78 will expand as they pass the port 82 and contract as they pass the port 80. Thus, the port 82 will be an inlet port and the port 80 will be an outlet port. If the ring 58 is pivoted clockwise about the pin 60, the chambers 78 will expand as they pass the port 80 and contract as they pass the port 82. Thus, the port 80 will be the inlet port and the port 82 will be the outlet port. The pump 56 is a variable displacement pump that will provide the function or operation required at the pump 26 in FIGS. 1, 2, 3 and 4.

To provide this function, the port 80 can be connected to the passage 24 and the port 82 can be connected to the passage 22. The pump 56 will be operable to move the fluid, as required, between the passages 22 and 24 and therefore between the control pistons 28 and 34. When the fluid transfer requirements of the pump 56 are decreased during the steady state operation of the CVT 42, the ring member 58 will be held near the neutral position shown. This will permit the pump 56 to transport only sufficient fluid to account for leakage in the system.

Figure 6:
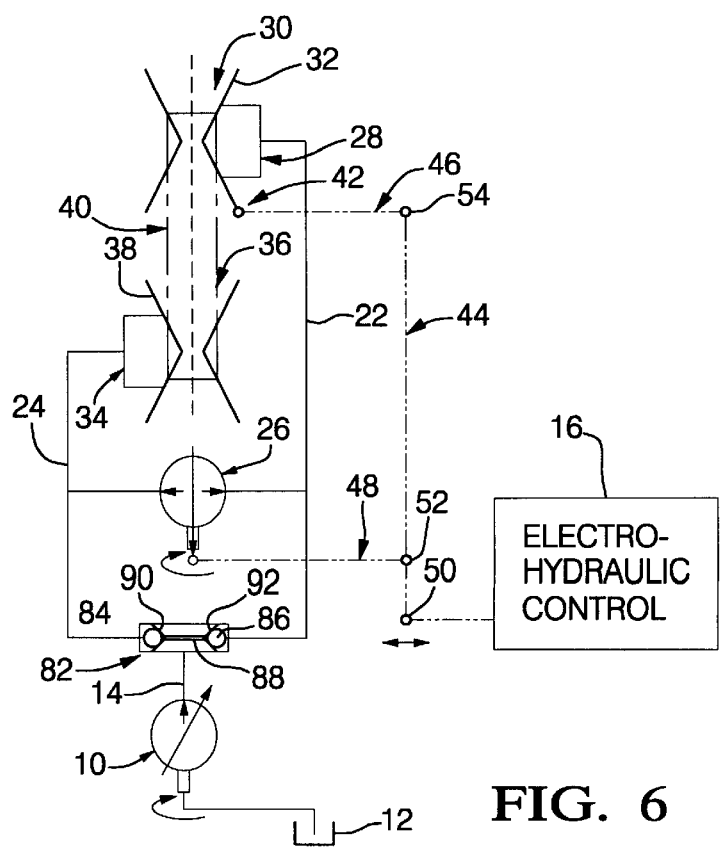
FIG. 6 is a schematic representation of another embodiment of the present invention.

The embodiment shown in FIG. 6 is similar to the embodiment shown in FIGS. 1 through 4 with the exception that the two check valves 18 and 20 have been incorporated into one check valve assembly 82. This assembly 82 has two ball checks 84 and 86 that are separated by a rod 88. Each ball check 84 and 86 has a respective valve seat 90, 92. When the ball check 84 or 86 abuts the respective valve seat 90 or 92, the respective passage 24 or 22 will be closed. Under this condition, the primary pump 10 will not deliver fluid to the closed passage. However, the rod 88 ensures that one of the ball checks 84 or 86 will be unseated. This insures that at least one of the ball checks 84 or 86 will not be in sealing engagement with its respective seat and, therefore, the primary pump 10 is always in fluid communication with at least one of the passages 22 and 24.

What is claimed is:

1. A control for a continuously variable transmission having a drive sheave, a driven sheave, a flexible transmitter trained about the sheaves, and a selectively pressurizable control piston for each sheave for enforcing adjustment of the sheaves to control the speed ratio therebetween, said control comprising:

first and second fluid passage means for communicating fluid to and from the drive sheave and the driven sheave, respectively;

a source of primary pressure comprising a variable displacement pump communicating with said fluid passage means for pressurizing at least one of said passage means and the sheave communicating therewith at a pressure level determined by the torque requirement of the continuously variable transmission;

check valve means in each of said passage means downstream of said source of primary pressure to inhibit fluid flow from said first and second passage means to said source of primary pressure;

ratio control pressure source means comprising a variable displacement fluid pump for communicating fluid between said first and second passage means downstream of said check valve means for increasing a pressure level in one of said passage means to adjust the speed ratio between the sheaves; and electro-hydraulic control means for controlling the pressure level of said source of primary pressure and for initiating and controlling the speed ratio between the sheaves.

* * * * *